United States Patent [19]

Collins

[11] Patent Number: 4,755,916

[45] Date of Patent: Jul. 5, 1988

[54] COMBINED FLOOD AND SPOT LIGHT

[75] Inventor: William J. Collins, Boulder, Colo.

[73] Assignee: Collins Dynamics, Aurora, Colo.

[21] Appl. No.: 285,944

[22] Filed: Jul. 23, 1981

[51] Int. Cl.[4] .............................................. F21V 7/05
[52] U.S. Cl. .................................... 362/236; 362/241; 362/298
[58] Field of Search .................. 362/61, 64, 80, 83, 362/235, 236, 241, 242, 243, 247, 248, 298, 303, 307, 311

[56] References Cited

U.S. PATENT DOCUMENTS

| | | | |
|---|---|---|---|
| 1,144,676 | 6/1915 | Wilson | 362/243 |
| 1,148,101 | 7/1915 | Kush | 362/247 |
| 2,117,099 | 5/1938 | Maly | 362/243 |
| 2,755,374 | 7/1956 | Ott | 362/247 |
| 3,622,778 | 11/1971 | Cibie | 362/247 |
| 3,749,906 | 7/1973 | Thiry | 362/303 |
| 3,759,084 | 9/1973 | Plewka | 362/311 |
| 3,870,876 | 3/1975 | Puyplat | 362/247 |
| 4,320,442 | 3/1982 | McCamy | 362/303 |

FOREIGN PATENT DOCUMENTS 2702389 7/1978 Fed. Rep. of Germany ...... 362/247

Primary Examiner—Donald P. Walsh
Attorney, Agent, or Firm—Holland & Hart

[57] ABSTRACT

A light is provided which includes a first, forwardly concave reflector member, a first, forward lamp spaced ahead of the reflector member, and a second rearwardly concave reflector member spaced forward of the lamp. The rear reflector member has a generally parabolic surface and the forward member has a generally arcuate surface. When the lamp is activated, its rays generally travel forward, are reflected off the second reflector member rearward onto the first reflector member, and thence forward in a substantially parallel array to provide a spot light. A second lamp is located axially rearward of the first lamp and forward of the first reflector. When this lamp is activated, its rays travel generally laterally, strike the first reflector member, and thence are reflected forward in generally random array to provide a flood light. Means are provided to selectively activate either or both of said lamps. In a further embodiment, the first reflective member has a spherical central portion and a parabolic peripheral portion.

19 Claims, 3 Drawing Sheets

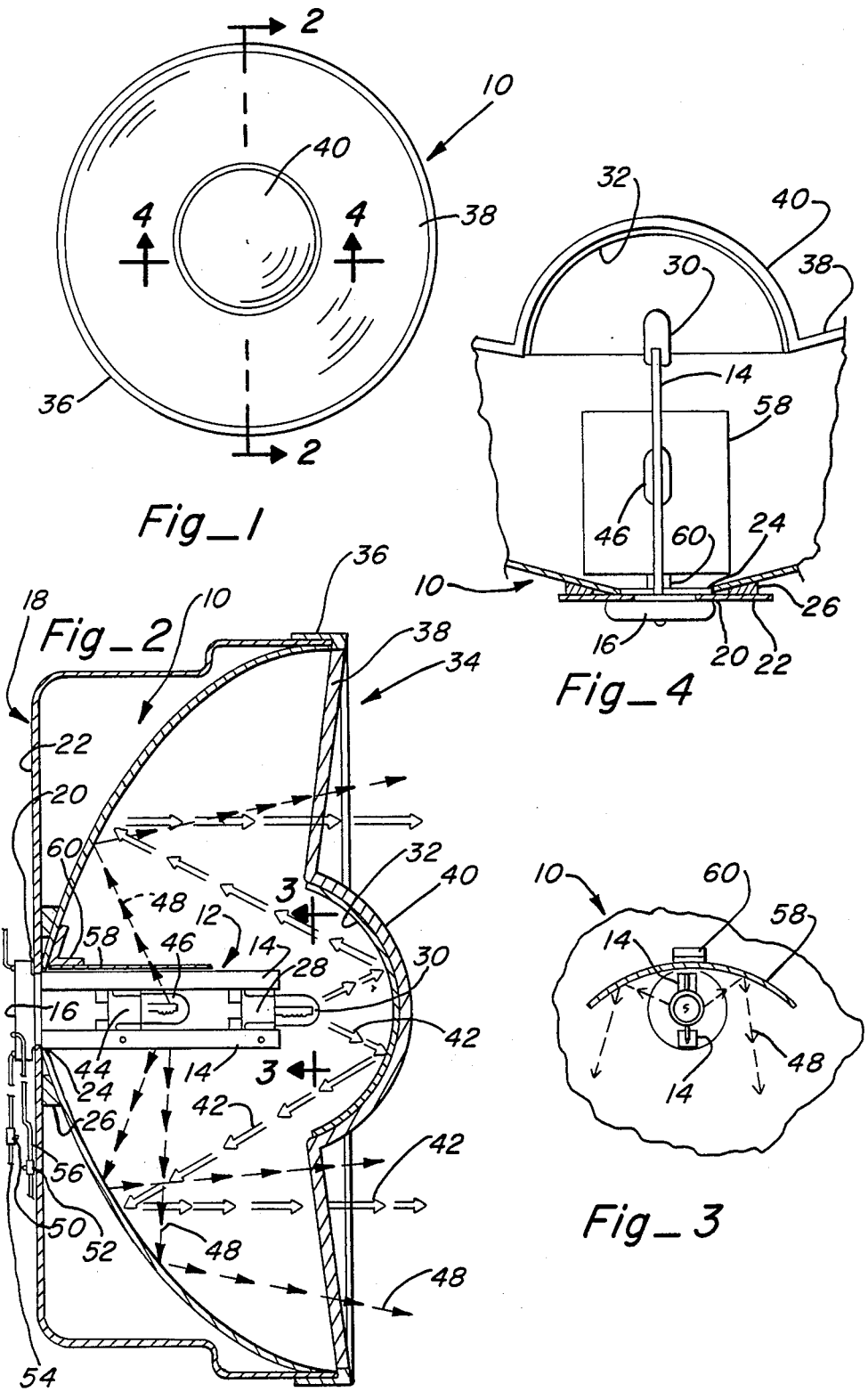

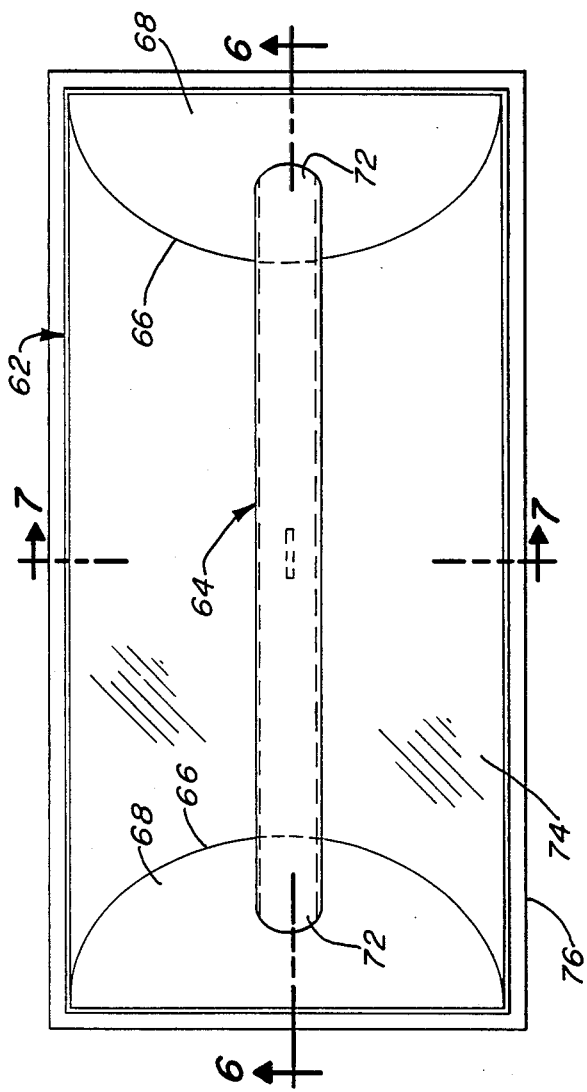
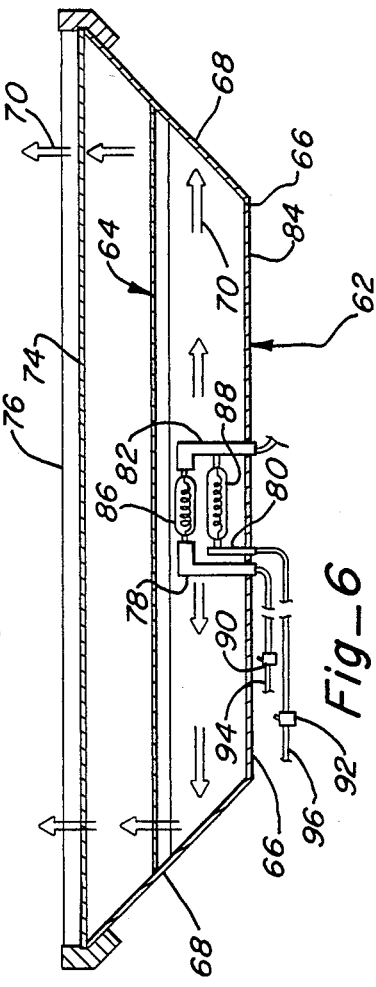
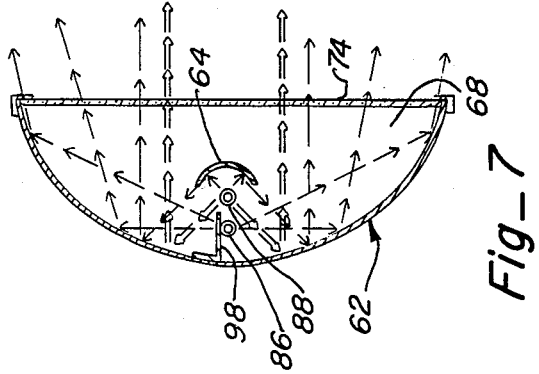
Fig_5
Fig_6
Fig_7

COMBINED FLOOD AND SPOT LIGHT

DESCRIPTION

1. Technical Field

This invention relates to a dual function light, more particularly to a light which can be used either as a spot light or a flood light separately or as both spot and flood light at the same time. The construction uses a minimum quantity of components which are readily assembled to produce a high quality article at a low cost. The light has high utility in fire and police work because of the two types of beams available, although it is primarily intended for use on automobiles as a spot light and as a flood or fog light.

2. Background Art

Separate units for flood or fog lighting and for spot lighting have been available for many years. Campers and policemen and firemen have used them without too much inconvenience because they can be hung from belts or otherwise and whichever unit is desired can be taken in hand readily when needed. However, it is apparent that a single unit having both capabilities in the space of one would be highly desirable in any case and particularly so when the lights are mounted on motor vehicles where the space for attachment is growing less as cars are growing smaller.

Various schemes for accomplishing these ends have been proposed from time and time, and have involved placing two light sources within one envelope, each being mounted and arranged to provide one of the desired types of beams. Two examples are the U.S. Pat. No. 3,622,778 to Cibie and the U.S. Pat. No. 3,870,876 to Puyplat. Each of these patents discloses a generally similar dual light driving light for automobiles in which a bulb is mounted centrally of a typical reflector, and a complete, separate second reflector is mounted within the confines of the first reflector and contains a second bulb. The second reflector is about one half the diameter of the first reflector and is located entirely to one side of the fore and aft axis of the first reflector. Consequently, the first reflector must be quite large or the second reflector must be rather small. Although this type of light performs its dual function satisfactorily, its design limitation and relative complexity detract from its desirability.

Another type of dual function light is represented by U.S. Pat. No. 1,148,101 to Kush and U.S. Pat. No. 3,759,084 to Plewka. Each has a first reflector with a first lamp and a second reflector mounted in spaced relation concentrically within the first reflector and provided with its own lamp which is spaced axially forward of the first lamp. In Kush, the idea is that the first lamp produces a dim light, the second lamp produces a medium light and the two lamps together produce a bright light. In Plewka the idea is that the second lamp produces the usual bright driving light and the first lamp illuminates the surrounding area to reduce the dazzling effect of the second lamp. In both cases, all of the rays are emitted in random array and produce a flood light effect and consequently there is no way to produce an alternative spot light effect.

DISCLOSURE OF INVENTION

In accordance with the present invention, a light for driving or other use is provided which may be utilized as a spot light or a flood light or both at the same time with a single unit of great simplicity. In its essential aspects, it includes a first, forwardly concave reflector member having a substantially parabolic cross section mounting means carried by the reflector member and extending to a point axially forward of the rear wall of the reflector member, and in a first, forward lamp carried by the mounting means in axially forwardly spaced relation to the rear wall of the first reflector member.

A second, rearwardly concave reflector member having a substantially arcuate cross section is mounted in axially spaced relation forwardly of the first, forward lamp.

A second, rearward lamp is supported on the mounting means in axially spaced relation behind the first lamp and forward of the rear wall of the first member. Thus, the two reflector members and the two lamps are all arranged in axial alignment with each other. Typical switch means are provided to selectively activate either or both of said lamps.

The relative dimensions and locations of the components so far described with respect to each other are so chosen that the rays emanating from the first, forward lamp will travel primarily forward to strike the second reflector member. There they will be reflected rearward to strike the first reflector member which will reflect them forward in substantially parallel array, providing a spot light effect. The rays emanating from the second, rearward lamp will travel primarily laterally to strike the first reflector member which will reflect them forward in random array, providing a flood light effect.

In the presently preferred embodiment each of the reflector members comprises a surface of revolution swung about the fore and aft axis of the axially spaced lamps so that they are circular in elevation. A circular transparent glass plate extends across the open end of the first reflector member and serves as a closure for the unit. The central portion of the plate is the same size and shape as the second reflector member which is mounted in the concavity of the plate, and the area around the second reflector member is the lens of the unit. The entire plate is preferably tempered glass.

If it is desired to limit the projection of the flood type beam to only a portion of the lens, such as the upper or lower half, a shield may be mounted laterally of the rearward lamp to bar travel of its rays to that portion of the first reflector member behind the shield. The shield may take the form of a part of a cylinder having an axis extending fore and aft parallel to the axis of the lamp arrangement, and the inner surface of the shield may have a mirror finish to reflect the rays of the lamp to the opposite portion of the first reflector member.

In a modification of the light just described, the first reflector member is trough-shaped with a substantial lateral extent and with its parabolic cross section in a vertical plane extending fore and aft normal to its lateral extent, and the second reflector member is also trough-shaped with a substantial lateral extent and its arcuate cross section is in a vertical plane extending fore and aft normal to its lateral extent.

The ends of the first reflector member are cut at a forwardly diverging angle and its open ends are closed with correspondingly shaped plate members which intercept rays traveling laterally and direct them forwardly.

Since the second reflector member is also elongate it is supported in position by securing its ends to the angular plate members so that the two reflector members may be rigidly retained in parallel relation with each other.

In order to increase the widths of the beams of light projected forward, each of the lamps may be so arranged on the mounting means that its filament will extend laterally.

As in the case of the first embodiment, a light shield may be mounted close to the rearward lamp either above or below it to bar travel of the emitted light rays to the lower or upper portion of the first reflector member as may be desired. Various other advantages and features of novelty will become apparent as the description proceeds in conjunction with the accompanying drawings.

A further modification is provided wherein the central portion of the first reflector is spherical, whereas the outer portion is parabolic. This modification has particular application for general use lights where both spot light and flood light capabilities are desired.

BRIEF DESCRIPTION OF DRAWINGS

FIG. 1 is a front elevational view of the presently preferred embodiment of the light of this invention;

FIG. 2 is an enlarged vertical sectional view of the light taken on line 2—2 of FIG. 1;

FIG. 3 is an elevational view, partly in section, taken on line 3—3 of FIG. 2;

FIG. 4 is a fragmentary; horizontal section, taken on line 4—4 of FIG. 1;

FIG. 5 is a front elevational view of a second embodiment of the light of this invention;

FIG. 6 is a horizontal sectional view taken on line 6—6 of FIG. 5;

FIG. 7 is a vertical sectional view taken on line 7—7 of FIG. 5; and

DESCRIPTION OF PREFERRED EMBODIMENTS

Figure 8:
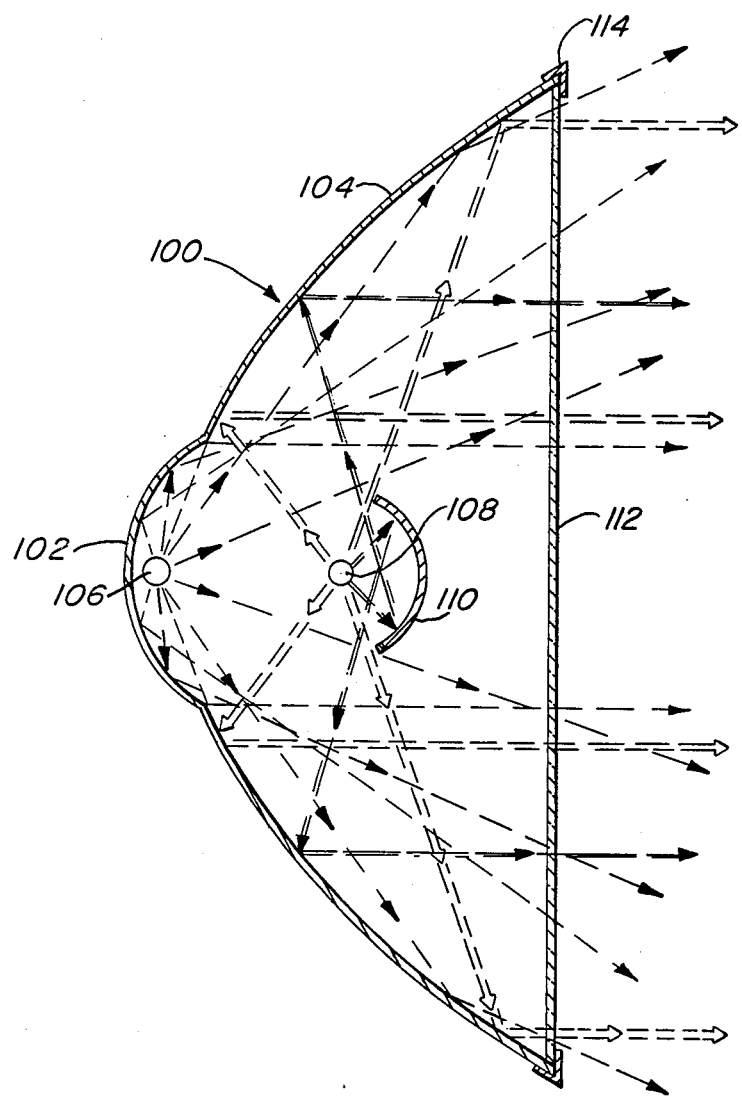
FIG. 8 is a vertical section of a third embodiment of this invention.

The presently preferred construction of the light of this invention is illustrated in FIGS. 1 to 4, in which FIG. 1 shows that the light is basically circular in its frontal view. The major details are shown in the sectional view of FIG. 2, in which it will be seen that a first reflector member 10 is provided which is forwardly concave and which has a parabolic cross section in a vertical plane extending fore and aft and normal to its lateral expanse. In this embodiment the reflector member is actually a parabolic surface of revolution swung about its fore and aft axis. Mounting means 12 may be secured to the reflector member at any place in any suitable way but in the present case are shown as a pair of posts 14 secured to a base 16 and extending forwardly parallel to the axis of the reflector member. The latter is surrounded by a protective housing 18 having a forward free edge coterminous with the free edge of the reflector member and having a central opening 20 in its rear wall 22 registering with a central opening 24 in the rear wall of the reflector member. A tapered washer 26 is interposed between the housing and the reflector, and the three are secured together by any suitable means such as soldering, brazing, welding or the like. The posts are extended through openings 20 and 24, and base 16 is secured to the assembly by suitable means.

At their forward ends the posts 14 carry a socket 28 in which is mounted a first, forwardly lamp 30 in axially forwardly spaced relation to the rear wall of the first reflector member 10. A second rearwardly concave reflector member 32 having a substantially arcuate cross section is mounted in axially spaced relation forwardly of lamp 30. A circular transparent glass plate 34 extends across the open end of the first reflector member 10 to serve as a closure for the unit and is held in place by frame 36. The annular outer portion or ring 38 of the plate serves as the lens for transmitting the light, while its central portion 40 is of the same size and shape as the second reflector member 32, and the reflector member is mounted in the concavity of portion 40. Preferably the plate is formed of tempered glass.

The relative dimensions and locations of the components with respect to each other are so chosen that the rays 42 emanating from lamp 30 will travel primarily forward as indicated in FIG. 2 to strike reflector member 32. There they will be reflected rearward to strike reflector member 10, which will reflect them forward in substantially parallel array, providing a spot light effect.

A second socket 44 is carried by posts 14 at a location in axially spaced relation behind socket 28 and forward of the rear wall of reflector member 10, and a second rearward lamp 46 is mounted in the socket. The rays 48 emanating from lamp 46 travel primarily laterally to strike reflector member 10 which will reflect them forward in random array, providing a flood light effect.

Separate switches 50 and 52 of conventional design are interposed in conductors 54 and 56 which are connected to a suitable power supply. Either switch may be tripped separately to activate one or the other of the lamps or they both may be tripped at the same time to activate both lamps where desired.

In some cases it may be desired to bar the light rays 48 from striking a portion of the first reflector, such as the lower or upper half, and thus to limit the projection of the flood type beam to the other portion of the lens. This is of particular importance and use in a driving light for an automobile. For this purpose, a shield 58 may be mounted laterally of rearward lamp 46 by means of a bracket 60 connected to the first reflector member as shown in FIGS. 2, 3, and 4. The shield may take the form of a part of a cylinder having an axis extending fore and aft parallel to the axis of the lamp arrangement, and its inner surface may have a mirror finish to reflect the rays of the lamp to the opposite portion of the first reflector member, as indicated in FIG. 3.

A modification of the embodiment just described is illustrated in FIGS. 5, 6, and 7, in which it will be seen that the first reflector member 62 is trough-shaped with a substantial lateral extent but it still has a parabolic cross section in a vertical plane extending fore and aft normal to its lateral extent. The second reflector member 64 is also trough-shaped with a substantial lateral extent and its arcuate cross section is in a vertical plane extending fore and aft normal to its lateral extent.

As seen in FIGS. 5 and 6, the end portions 66 of member 62 are cut at forwardly diverging angles and a pair of end plate members 68 are shaped to correspond to the end openings and are secured in place by any suitable means. Any light rays 70 emanating laterally to either side will be reflected forward as shown in FIG. 6. The second reflector member 64 has its ends 72 cut at the same angle as the setting of end plate members 68 and it is secured directly to them by any suitable means such as soldering, welding, or the like. A glass cover plate 74 closes the open side of the light and is held in place by frame 76.

A plurality of support posts 78, 80 and 82 are generally centrally mounted in the rear wall 84 of member 62 and carry a first, forward lamp 86 in a position spaced axially forward of rear wall 84, and a second, rearward lamp 88 spaced axially rearward of the first lamp and axially forward of wall 84. The second reflector member 64 is spaced forward of lamp 86. Switches 90 and 92 are interposed in conductors 94 and 96 which are connected to a suitable power source, and the switches may be used to activate the lamps separately or together as desired.

As will be observed in FIG. 7, the light of this embodiment operates in substantially the same way as the light of the first embodiment. Since the reflector members are not surfaces of revolution about a fore and aft axis, the light rays traveling to the sides are not so effective but those going up and down to the reflector surfaces produce comparable beams. As shown in FIG. 6 each of the lamps is preferably mounted so that its filament extends laterally to increase the width of the beam of light projected forward.

As in the first form, a light shield 98 may be mounted above or below the rearward lamp 88 to bar travel of the emitted light rays to a selected portion of reflector member 62.

A further alternative embodiment is shown in FIG. 8 in diagrammatical form. This embodiment has particular application for a portable light which is to serve as either a flood or spot light. In this embodiment, the first reflector 100 has a spherical portion 102 at the center thereof surrounded by a parabolic portion 104, as shown. A first light source 106 is positioned adjacent the spherical portion 102 and a second light source 108 is actually aligned with the first light source and is positioned adjacent a second spherical reflector 110. The front of reflector 100 is closed by a lens or glass plate 112 which is held in place by a frame 114, as shown.

As will be readily apparent, the light from rear lamp 106 will be reflected in a random pattern from the light either directly through the lens or off of the spherical portion 102 and reflector 100 to provide a flood light. On the other hand, the light from the forward lamp 108 will be reflected, for the most part, off the parabolic surface 104 in a parallel pattern or will reflect from spherical mirror 100 onto parabolic surface 104 and hence in a parallel to provide a spot light. Although not shown, it will be understood that lamps 106 and 108 may be mounted similarly to those shown in FIG. 2 and that the electrical circuitry would be similar to that described for the embodiment shown in FIG. 2.

The invention has been described in detail with particular reference to preferred embodiments thereof, but it will be understood that variations and modifications can be effected within the spirit and scope of the invention.

I claim:

1. A combined flood and spot light comprising:
   a first reflector member having a rear wall, said reflector member of substantially parabolic cross section and projecting in a forward direction from said rear wall;
   mounting means carried by said reflector member supporting a forwardly directed first lamp at an axially forwardly spaced relation to the rear wall of the first reflector member;
   a second reflector member having a substantially arcuate cross section mounted in axially spaced relation forwardly of the first lamp, said second reflector member projecting in a rearward direction toward said rear wall;
   a second lamp supported on said mounting means in axially spaced relation behind the first lamp and forward of the rear wall of the first reflector member, said second lamp being forwardly directed;
   means to selectively activate either or both of said lamps; and
   the relative dimensions and locations of the first and second lamps and first and second reflectors being so chosen that the rays emanating from the first lamp travel primarily forward and are reflected by the second reflector member rearward to the first reflector member and thence are reflected forward in substantially parallel array to provide a spot light, and the rays emanating from the second lamp travel primarily laterally to the first reflector member and thence are reflected forward in random array to provide a flood light.

2. A combined flood and spot light, as claimed in claim 1, in which:
   the first and second reflector members comprise surfaces of revolution swung about the fore and aft axis of the axially spaced lamps.

3. A combined flood and spot light, as claimed in claim 2, in which:
   a light shield is mounted laterally of the second lamp to bar travel of its rays to that portion of the first reflector member behind the shield.

4. A combined flood and spot light, as claimed in claim 3, in which:
   the shield has the form of a part of a cylinder having an axis extending fore and aft parallel to the axis of the lamp arrangement; and
   the inner surface of the shield has a reflecting surface to reflect the rays of the lamp to the opposite portion of the first reflector member.

5. A combined flood and spot light, as claimed in claim 2, in which:
   a circular transparent glass plate extends across the open end of the first reflector member and serves as a closure therefor and also serves as a support for the second reflector member.

6. A combined flood and spot light, as claimed in claim 5, in which:
   the central portion of the glass plate is of the same size and shape as the second reflector member, and the latter is located in the concavity of the plate.

7. A combined flood and spot light, as claimed in claim 1, in which:
   the first reflector member is trough-shaped with a substantial lateral extent and its parabolic cross section is in a vertical plane extending fore and aft normal to its lateral extent; and
   the second reflector member is also trough-shaped with a substantial lateral extent and its arcuate cross section is in a vertical plane extending fore and aft normal to its lateral extent.

8. A combined flood and spot light, as claimed in claim 7, in which:
   the first reflector member terminates with matingly shaped end plate members to reflect lateral light rays forwardly.

9. A combined flood and spot light, as claimed in claim 8, in which:
   the second reflector member is mounted on the first reflector member by securing to the end plates of the first reflector member.

10. A combined flood and spot light, as claimed in claim 7, in which:
the filament of each of the lamps extends laterally, parallel to the axes of the reflector members, to increase the widths of the beams of light projected forward.

11. A combined flood and spot light, as claimed in claim 7, in which:
a light shield is mounted laterally of the second lamp to bar travel of its rays to that portion of the first reflector member behind the shield.

12. A combined flood and spot light, as claimed in claim 2, in which said first reflector member comprises:
a central portion having a spherical cross section; and
a peripheral portion having a parabolic cross section, so that light reflected from said second reflector and from said first lamp strike said parabolic portion and leave said lamp in a substantially parallel array to form a spot light and light from said second lamp strikes said spherical portion and leaves said lamp in a random array to form a flood light.

13. A combined flood and spot light comprising:
an integral reflector member having at least one reflecting surface and a rear wall, said one reflecting surface of a substantially parabolic cross section about a longitudinal axis of said light;
mounting means oriented in preselected position with respect to said reflector member supporting a first lamp and a second lamp in axially forwardly spaced relation to the rear wall of the reflector member on the longitudinal axis, said first lamp mounted at a preselected position, said first and second lamps forwardly directed relative to said rear wall; and
means to selectively activate said lamps, activation of said first lamp producing a spot light and activation of said second lamp producing a flood light.

14. A combined flood and spot light, as claimed in claim 13, in which:
the reflector member comprises a surface of revolution swung about the longitudinal axis of said light.

15. A combined flood and spot light, as claimed in claim 14, in which:
said first lamp is forward relative to the second lamp from said rear wall of said reflector member.

16. A combined flood and spot light, as claimed in claim 14, in which:
said preselected position of said first lamp is essentially at the focal point of the parabolic cross section of said reflector member.

17. A combined flood and spot light, as claimed in claim 14, in which:
a light shield is mounted laterally of the second lamp to bar travel of the second lamp's rays to that portion of the relfector member blocked by the shield.

18. A combined flood and spot light, as claimed in claim 17, in which:
the shield has the form of a part of a cylinder having an axis extending fore and aft parallel to the axis of the first and second lamps; and
the shield has an inner reflecting surface to reflect the rays of the second lamp to the opposite portion of the reflector member to that portion blocked by the shield.

19. A combined flood and spot light, as claimed in claim 14, in which said reflector member comprises:
a central reflecting surface having a spherical cross section; and
a peripheral reflecting surface having a parabolic cross section, so that light reflected from said lamp strikes said parabolic surface and leaves said first lamp in a substantially parallel array to form a spot light and light from said second lamp strikes said spherical surface and leaves said lamp in a random array to form a flood light.

* * * * *